(12) United States Patent
Faustinelli

(10) Patent No.: US 11,473,402 B1
(45) Date of Patent: Oct. 18, 2022

(54) PRESSURE-SENSITIVE OIL AND GAS DEVICES

(71) Applicant: Yottek Corp., Lewes, DE (US)

(72) Inventor: Jean Louis Faustinelli, Caracas (VE)

(73) Assignee: Yottek Corp., Lewes, DE (US)

( * ) Notice: Subject to any disclaimer, the term of this patent is extended or adjusted under 35 U.S.C. 154(b) by 0 days.

(21) Appl. No.: 17/691,025

(22) Filed: Mar. 9, 2022

(51) Int. Cl.
*E21B 34/08* (2006.01)

(52) U.S. Cl.
CPC .................... *E21B 34/08* (2013.01)

(58) Field of Classification Search
CPC ....... E21B 34/08; E21B 43/122; E21B 43/123
See application file for complete search history.

(56) References Cited

U.S. PATENT DOCUMENTS

| | | | | |
|---|---|---|---|---|
| 2,248,950 A * | 7/1941 | Boynton | ............... | E21B 43/123 137/155 |
| 2,385,316 A * | 9/1945 | Walton | .................. | E21B 43/123 137/155 |
| 2,642,811 A * | 6/1953 | Fletcher | ................ | E21B 43/122 417/113 |
| 2,797,700 A * | 7/1957 | McGowen, Jr. | ...... | E21B 43/123 92/37 |
| 3,208,398 A * | 9/1965 | Douglas | ................ | E21B 43/123 417/112 |
| 3,363,581 A * | 1/1968 | Kelley | .................. | E21B 43/123 137/155 |
| 11,326,425 B2 * | 5/2022 | Watson | .................... | E21B 43/12 |
| 2003/0111231 A1 * | 6/2003 | Faustinelli | ............ | E21B 43/123 166/373 |
| 2004/0182437 A1 * | 9/2004 | Messick | ................ | E21B 43/123 137/155 |
| 2011/0067879 A1 * | 3/2011 | Kleppa | ................. | E21B 43/123 166/326 |

* cited by examiner

*Primary Examiner* — Michael R Wills, III
(74) *Attorney, Agent, or Firm* — LeonardPatel PC; Michael Aristo Leonard, II; Sheetal Suresh Patel

(57) ABSTRACT

Devices that can be used to recover hydrocarbon production from closed-in oil wells capable of building up wellhead pressure and/or to sustain marginal oil production in oil wells are disclosed. Production in oil and natural gas producing wells in mature fields that have the ability to build up wellhead pressure and where the depletion of reservoir pressure has caused low or zero productivity may be automated. The devices include at least two bellows that facilitate their operation. The bellows may close the well to build up pressure in the wellhead and open the well to flow line pressure.

19 Claims, 7 Drawing Sheets

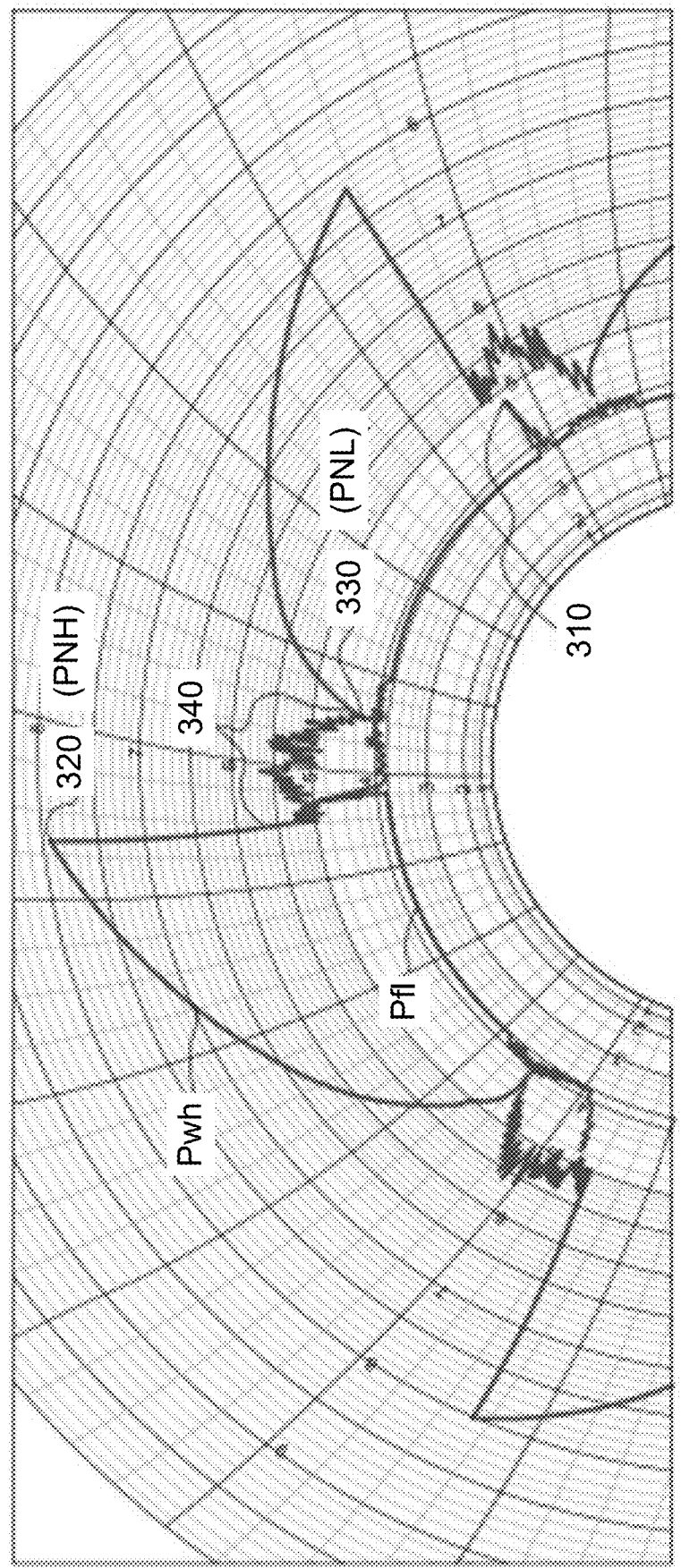

PRESSURE-SENSITIVE OIL AND GAS DEVICES

FIELD

The present invention generally relates to valves, and more specifically, to pressure-sensitive oil and gas devices that employ pressure sensors to control flow.

BACKGROUND

Mature oil and gas fields typically experience a decline in productivity due to the depletion of reservoir pressure. Such mature oil and gas fields may have marginal wells that have low output or are totally inactive. In some cases, the useful life of marginal oil or condensate gas wells can be extended by employing an artificial lift system. However, in wells that are not profitable, the available increase in pressure capacity is not normally used, and this remaining energy is not used obtain additional commercial production.

To date, the only tool that has been able to extend reservoir production is a downhole choke installed at the bottom of the well, where a higher gas-to-liquid ratio is obtained, generating a lower flowing pressure gradient. For instance, U.S. Pat. No. 6,827,146 describes a double bellows gas lift valve where the operating valve reacts with both gas pressure and fluid pressure in the production pipeline. The double bellows gas lift valve can be installed in a pocket mandrel in wells equipped with such an artificial lift system, as the double bellows gas lift valve is designed to be installed at the bottom of the well. The double bellows gas lift valve requires a high gas pressure supply.

However, surface-mounted tools that extend well life, and tools that operate intermittently, are not provided. Accordingly, improved tools and techniques may be beneficial.

SUMMARY

Certain embodiments of the present invention may provide solutions to the problems and needs in the art that have not yet been fully identified, appreciated, or solved by conventional oil and gas valve technologies. For example, some embodiments pertain to a device that can be used to recover hydrocarbon production from closed-in oil wells capable of building up wellhead pressure and/or to sustain marginal oil production in oil wells. The device in some embodiments includes two pressure "sensors"—a high-pressure sensor that is activated by the wellhead pressure and a low-pressure sensor that closes according to the flow line pressure. These sensors may not include electronics in many embodiments and may operate without human interaction. In accordance with the behavior of the reservoir, the flow may be continuous or intermittent through the appropriate choke size located at the outlet of the device and installed in the wellhead choke box.

In an embodiment, a pressure-sensitive apparatus for controlling production of oil or gas in a well includes a high-pressure valve (HPV) configured to receive a pressure of the well. The HPV includes an HPV bellows pressurized to an HPV opening pressure. The pressure-sensitive apparatus also includes a low-pressure valve (LPV) including an LPV bellows pressurized to a closing pressure. The HPV is configured to open the apparatus to produce oil or gas when the HPV exceeds the HPV opening pressure. The LPV is configured to close the apparatus when the LPV reaches the closing pressure.

In another embodiment, a pressure-sensitive oil and gas device includes a standard valve including an HPV bellows, an inlet, and an outlet. The pressure-sensitive oil and gas device also includes a balanced valve that includes an inlet and an LPV bellows. The pressure-sensitive oil and gas device further includes a perforated stem operably connected to the LPV bellows and a stem nose including a conductor pipe. The stem nose is operably connected to the LPV bellows via the perforated stem.

In yet another embodiment, a pressure-sensitive oil and gas device includes a standard valve including an HPV bellows, an inlet, and an outlet. The pressure-sensitive oil and gas device also includes a balanced valve including an inlet and an LPV bellows. The pressure-sensitive oil and gas device further includes a perforated stem operably connected to the LPV bellows and a stem nose including a conductor pipe. The stem nose is operably connected to the LPV bellows via the perforated stem. Additionally, the pressure-sensitive oil and gas device includes a valve head including a valve head inlet. The valve head is configured to provide an interface to oil or gas at a well pressure. The HPV bellows is pressurized to an HPV opening pressure that is greater than a pressure of the LPV bellows and not more than a maximum well pressure. The LPV bellows is pressurized to at least the flow line pressure. The HPV bellows and the LPV bellows are biased to be in a closed position. The pressure-sensitive oil and gas device is configured to be installed in a choke box of the well.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 3 is a graph illustrating operation of a pressure-sensitive oil and gas device from a Barton gauge, according to an embodiment of the present invention.

Unless otherwise indicated, similar reference characters denote corresponding features consistently throughout the attached drawings.

DETAILED DESCRIPTION OF THE EMBODIMENTS

Figure 1A:
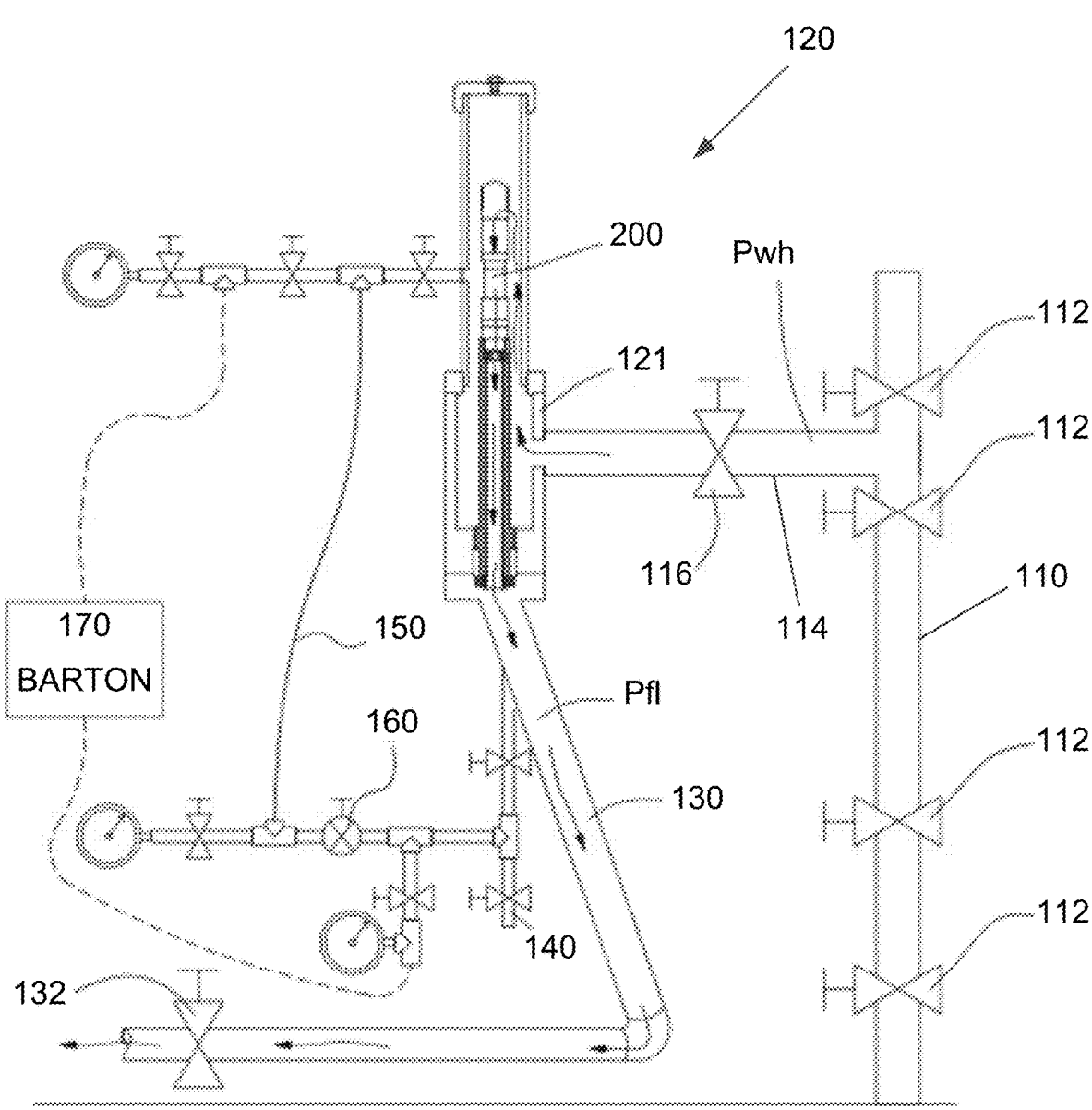
FIG. 1A is an architectural diagram illustrating a surface wellhead system, according to an embodiment of the present invention.

Some embodiments pertain to a device that can be used to recover hydrocarbon production from closed-in oil wells capable of building up wellhead pressure and/or to sustain marginal oil production in oil wells (e.g., wells that have the ability to restore pressure from the bottom to the wellhead through tubing). Such wells may have low pressure and not be producing without the assistance of the device of some embodiments. Production in oil and natural gas producing wells in mature fields that have the ability to build up wellhead pressure and where the depletion of reservoir pressure has caused low or zero productivity may be automated. The device of some embodiments includes at least two bellows that facilitate its operation. The bellows may close the well to build up pressure in the wellhead and, when pressure builds such that it is sufficient for production, the bellows open the well to flow line pressure.

Unlike existing valves, some embodiments are installed in the choke box of the well. Lines do not need to be cut and digging is not required to install the device of some embodiments further down in the well. This allows the device to be readily installed, configured, and removed as desired. Furthermore, the energy of the well is harnessed to operate the device.

When the device of some embodiments is initially installed in the well choke box, the behavior of that specific well may not be known. The opening pressure, the closing pressure, and the size of the choke may be modified based on the operating conditions of a given well to optimize operation. For instance, if the well pressure builds to a maximum pressure of 300 pounds per square inch (psi), 1,000 psi, etc., the device may be configured such that this is the opening pressure. The closing pressure may be configured in accordance with the flow line pressure (e.g., 20 psi). However, in certain embodiments, the opening pressure may be set to less than the maximum pressure, the closing pressure may be set to more than the flow line pressure, or both. These can also be modified over the course of well operation as conditions change (e.g., the oil or gas in the well is further depleted over time). To calibrate, the gas pressure in the bellows may be increased or decreased depending on whether the desired opening/closing pressure should be raised or lowered for the high-pressure bellows and the low-pressure bellows, respectively.

The double bellows mechanism of some embodiments allows the opening and closing of the device to be controlled depending on the pressure restoration rate. The device of some embodiments is installed in the choke box of the wellhead and a reduction choke is set at the outlet of the device. The device is in direct contact with oil and gas during the production cycle. The cycle starts in some embodiments once accumulated pressure in the tubing (also called a line or a pipe herein) is greater than the calibration pressure of the bellows. This causes the stems to act and allows fluid to move from the bottom of the well into the flow line until the pressure drops to match the low closing pressure of the bellows, providing intermittent production. It should be noted that no tubing/line is in contact with the wellhead pressure and the tubing/line is at relatively low pressure in contact with the flowing station.

The device of some embodiments includes at least two bellows and an internal flow regulator that sends the fluid past the bellows, even when the discharge bellows is already closed due to the decrease in pressure in the well. The production cycle may be repeated as many times as the reservoir allows pressure to be restored (e.g., multiple times per day), reducing downtime of wells and increasing the amount of crude oil and gas produced as a result of the number of cycles and fluid volume displaced towards the surface.

The mechanical operation and pressure-to-fluid relationship supported by the autonomous system of the device in some embodiments may automate oil and gas production without the need for a power supply. This may be especially beneficial in remote areas. Production can be intermittent or continuous, depending on well potential. The autonomy of the device in some embodiments is also beneficial for installation in wells located in remote areas that are difficult to access. The device of some embodiments works for both offshore and onshore installations. Advantageously, the device of some embodiments is surface-mounted and may be operated intermittently.

LIST OF COMPONENTS IN FIGURES

For convenient reference, the components and corresponding reference numerals in FIGS. 1A, 1B, and 2A-D are listed below.

Surface wellhead system—100
Production conductor—110
Master valves—112
Input portion of flow line—114
Arm valve—116
Wellhead—120 (includes upper two master valves 112, input portion of flow line 114, arm valve 116, choke box 121, and the part of output portion of flow line 130 near choke box 121)
Choke box—121
Plug cap—122
Sleeve—123
Sleeve box connector—124
Extension tube—125
Choke—126
Output portion of flow line—130
Flow line valve—132
Sampling line—140
Bypass line—150
Adjustable choke—160
Pressure recorder—170
Pressure-sensitive oil and gas device—200
Top sleeve—202
Top sleeve opening—203
Standard valve—204
Standard valve opening—205A
Standard valve outlet—205B
Middle sleeve—206
Balanced valve—208
Balanced valve opening—209A
Balanced valve outlet 209B
Top adapter—210
Middle adapter—212
Stem bellows—214
Lower sleeve—216
Lower adapter—218
Perforated stem—220
Stem nose—222
Valve head—224
Valve head inlet—225
Bellows anchor—228
Removable seat—230
Seat ring—232
Seat area—234

Conductor pipe—236
Rubber strippers—238
HPV—240
HPV bellows—242
LPV—250
LPV bellows—252

FIG. 1A is an architectural diagram illustrating a wellhead system 100, according to an embodiment of the present invention. A production conductor 110 includes master valves 112 located thereon that can restrict or prevent flow of oil or gas in production conductor 110. An input portion 114 of a flow line is connected to a choke box 121 and provides oil or gas from production conductor 110. An arm valve 116 can restrict or prevent oil or gas flow into choke box 121 of wellhead 120. A choke box 121 chokes flow into wellhead 120. A pressure-sensitive oil and gas device 200 is located within choke box 121 of wellhead 120 (see FIGS. 2A-D).

An output portion 130 of the flow line channels oil or gas that passes through pressure-sensitive oil and gas device 200, and the flow can be restricted or prevented by flow line valve 132. A sampling line 140 can be used to obtain liquid to analyze the water cut and density of oil, for example. If the reservoir is a good producer, a bypass line 150 enables continuous flow bypassing pressure-sensitive oil and gas device 200 if this is desired (e.g., sufficient pressure exists to provide the oil or gas without the aid of pressure-sensitive oil and gas device 200, which may provide intermittent flow). In this case, an adjustable choke 160 can be used to control the pressure of wellhead 120. A pressure recorder 170 (e.g., a Barton graph meter) records the pressures in wellhead system 100. In FIG. 1A and throughout, "Pwh" refers to the wellhead pressure and "Pfl" refers to the flow line pressure.

Figure 1B:
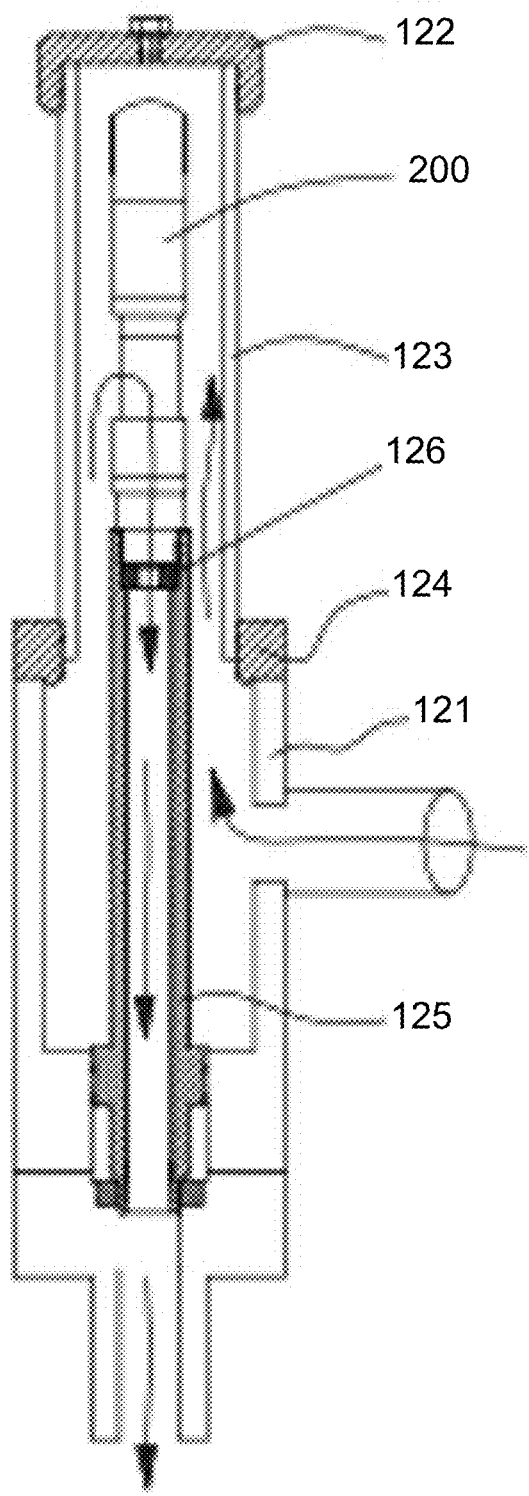
FIG. 1B is illustrates an enlarged view of a choke box of the wellhead of FIG. 1A with a pressure-sensitive oil and gas device installed, according to an embodiment of the present invention.

Turning to FIG. 1B, an enlarged view of choke box 121 of wellhead 120 is shown to better illustrate the components within choke box 121. A plug cap 122 and a sleeve 123 isolate pressure-sensitive oil and gas device 200 from atmospheric pressure. A sleeve box connector 124 connects sleeve 123 to choke box 121. An extension tube 125 connects pressure-sensitive oil and gas device 200 to output portion 130 of the flow line. A choke 126 controls fluid flow during the opening cycle of pressure-sensitive oil and gas device 200.

Figure 2A:
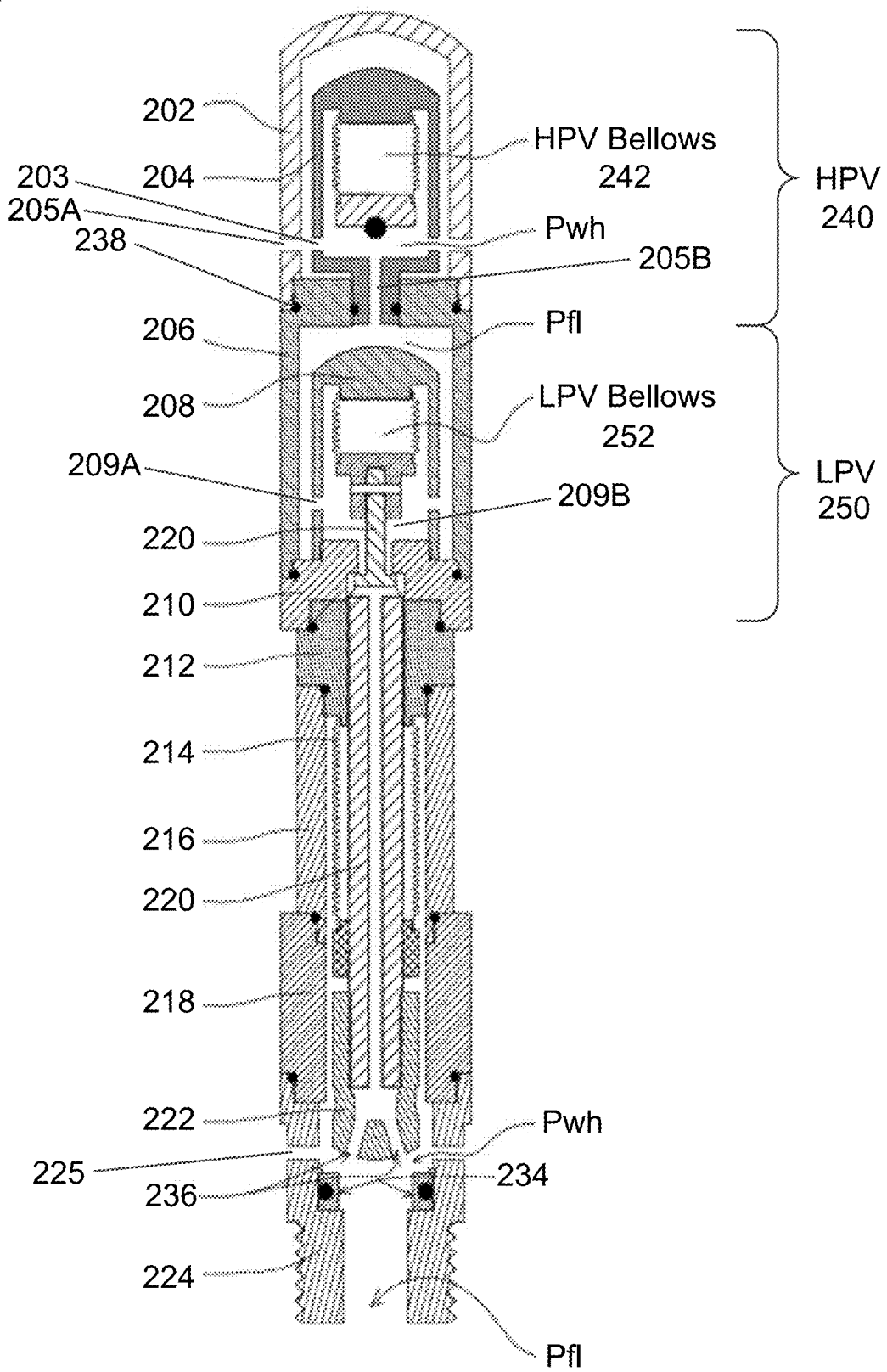
FIG. 2A is a side cutaway view illustrating a pressure-sensitive oil and gas device in an open position, according to an embodiment of the present invention.
Figure 2B:
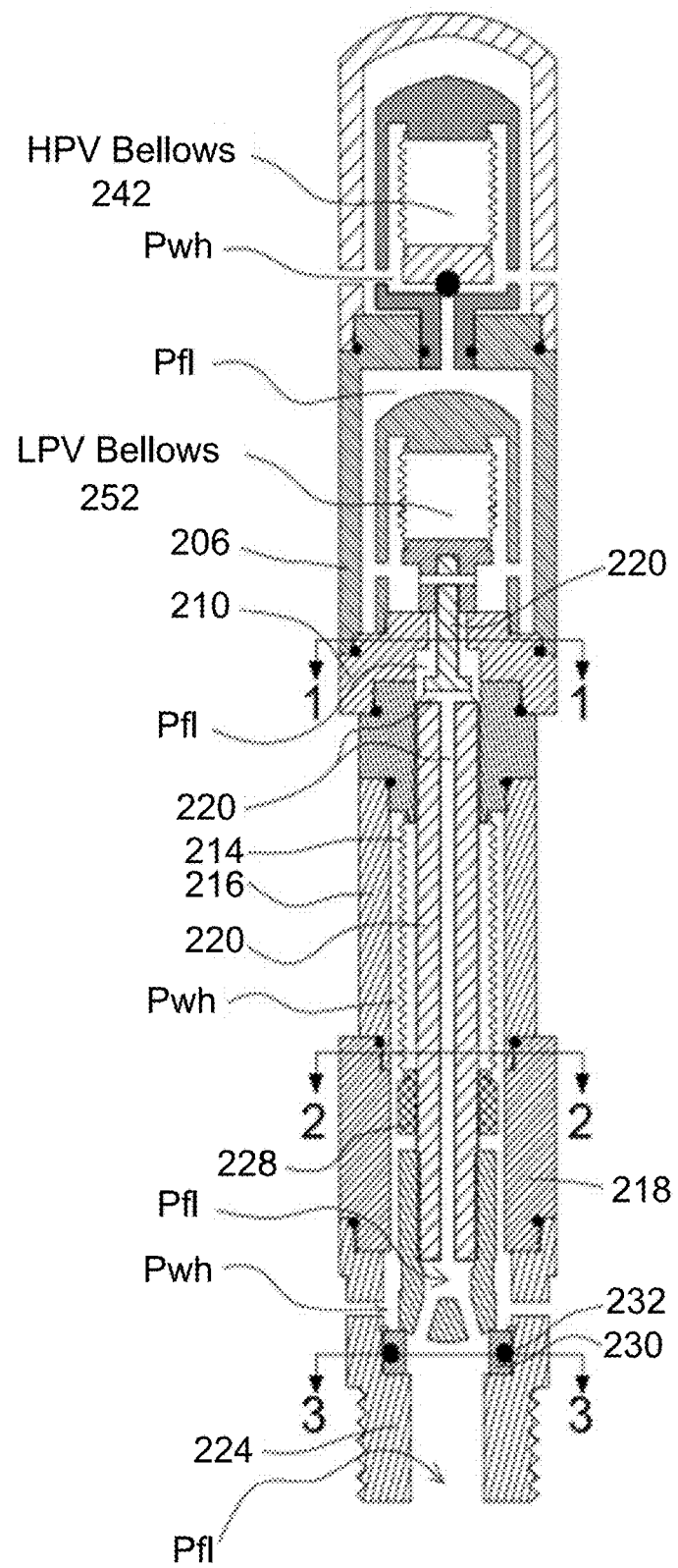
FIG. 2B is a side cutaway view illustrating the pressure-sensitive oil and gas device in a closed position, according to an embodiment of the present invention.

FIGS. 2A and 2B are side cutaway views illustrating pressure-sensitive oil and gas device 200 in an open position (well producing) and a closed position (restoring pressure), respectively, according to an embodiment of the present invention. Rubber strippers 238 seal the threads. In FIGS. 2A and 2B, "HPV" refers to the high-pressure valve 240 within pressure-sensitive oil and gas device 200 and "LPV" refers to the low-pressure valve 250 within pressure-sensitive oil and gas device 200. Pressure-sensitive oil and gas device 200 includes a top sleeve 202 that covers an upper portion thereof and a standard valve 204 that protects pressure-sensitive oil and gas device 200. When HPV 240 is open, oil or gas enters HPV 240 via top sleeve opening 203 and standard valve opening 205A, and exits standard valve 204 via standard valve outlet 205B into LPV 250. A middle sleeve 206 encloses a balanced valve (also called a low pressure valve) 208 that abuts a top adapter 210. Oil or gas enters balanced valve 208 via balanced valve opening 209A. Balanced valve 208 acts in two ways. When pressure-sensitive oil and gas device 200 is in the open position, balanced valve 208 opens according to the opening of HPV bellows 242, exposing balanced valve outlet 209B. When pressure-sensitive oil and gas device 200 is in the closed position, balanced valve 208 closes due to the lower pressure surrounding LPV bellows 252 causing the expansion of LPV bellows 252.

Top adapter 210 is positioned above a middle adapter 212, which is positioned above a lower sleeve 216 and a lower adapter is positioned below lower sleeve 216. A stem bellows 214 is housed within lower sleeve. Stem bellows 214 has the same area as seat 234 in this embodiment to prevent the well pressure from opening pressure-sensitive oil and gas device 200 prematurely when pressure-sensitive oil and gas device 200 is in the closed position. Stem bellows 214 is pressurized to the closing pressure of LPV bellows 252 in some embodiments. A perforated stem 220 is operably connected to balanced valve 208 and housed within middle sleeve 206, top adapter 210, middle adapter 212, lower sleeve 216, and lower adapter 218. Perforated stem 220 connects the pressure along pressure-sensitive oil and gas device 200.

A stem nose 222 is provided with a conductor pipe 236 to prevent premature shutdown, thus decreasing the suction effect of output portion 130 of the flow line and facilitating better draining of the well. A valve head 224 is the seat receptacle of seat 234. Valve head 224 also provides an interface to oil or gas at well pressure Pwh via valve head inlet 225. Perforated stem 220 allows communication of flow line pressure (Pfl) throughout pressure-sensitive oil and gas device 200. A bellows anchor 228 connects stem bellows 214 to perforated stem 220. A removable seat 230 provides a seal when pressure-sensitive oil and gas device 200 is in the closed position. A seat ring 232 avoids communication between the lower pressure (Pfl) and higher pressure (Pwh) portions. A seat area 234 is defined within the interior of seat ring 232.

In the open position, HPV bellows 242 and LPV bellows 252 are also in an open position (i.e., they are contracted), meaning that oil or gas can flow through pressure-sensitive oil and gas device 200. HPV bellows 242 and LPV bellows 252 are biased to be in the closed position. In other words, there is total communication between pressure-sensitive oil and gas device 200 and the Pwh of the well. This high pressure also exists through perforated stem 226 inside perforated stem 220. In this position, oil and gas flows through output portion 130 of the flow line due to the fact that HPV bellows 242 and LPV bellows 252 are open.

When the wellhead pressure Pwh decreases, HPV bellows 242 closes, and fluid is produced through balanced valve 208. If the field is lean, oil and gas is output through pressure-sensitive oil and gas device 200 and output portion 130 of the flow line cyclically until wellhead pressure Pwh reaches the closing pressure of balanced valve 208 (see FIG. 2B). If the reservoir maintains flow pressure, production will be passed through bypass line 150.

Referring to FIG. 2B, which shows pressure-sensitive oil and gas device 200 in the closed position, HPV bellows 242 cannot open because the wellhead pressure (Pwh) has not reached the pressure exerted by a gas (e.g., nitrogen) contained within HPV bellows 242. LPV bellows 252 does not open because the pressure exerted by the gas therein is higher than the flow line pressure (Pfl). Furthermore, because the pressure within LPV bellows 252 is balanced to Pfl, the high wellhead pressure, Pwh, does not influence opening of LPV bellows 252. Note that the cross-sectional area of stem bellows 214 is equal to the cross-sectional area of seat area 234 (see FIG. 2D). Over time, the wellhead pressure Pwh will open HPV bellows 242 and LPV bellows 252 to the position shown in FIG. 2A.

Figure 2C:
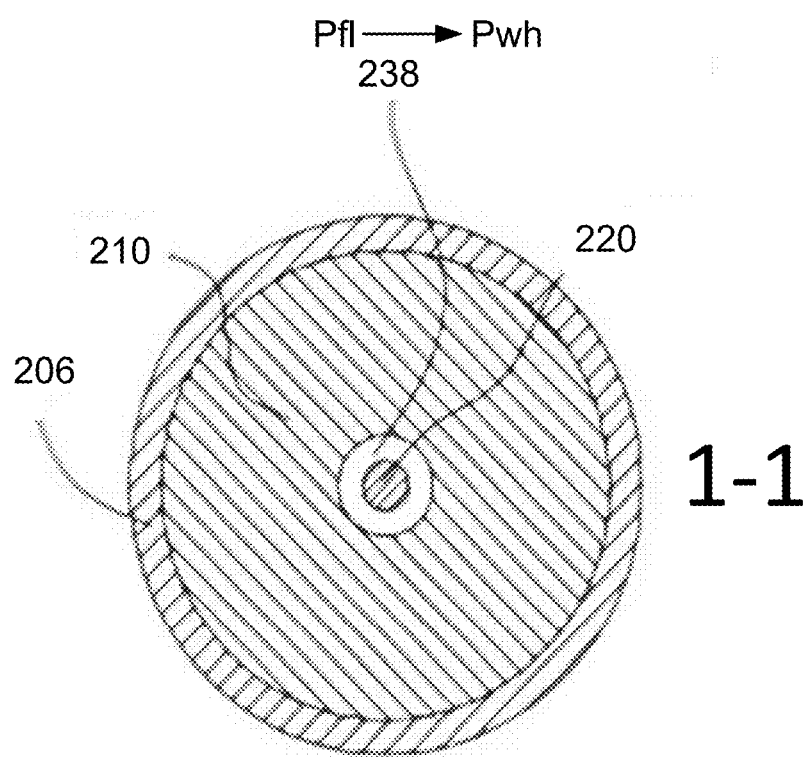
FIG. 2C shows cross-section 1-1 of the pressure-sensitive oil and gas device from FIG. 2B, according to an embodiment of the present invention.

FIG. 2C shows the 1-1 cross-section from FIG. 2B where a minimum annular flow area 238 is shown between top adapter 210 and perforated stem 220. The pressure will increase from Pfl to Pwh, forcing balanced valve 208 to open and allow oil or gas to flow through pressure-sensitive oil and gas device 200.

Figure 2D:
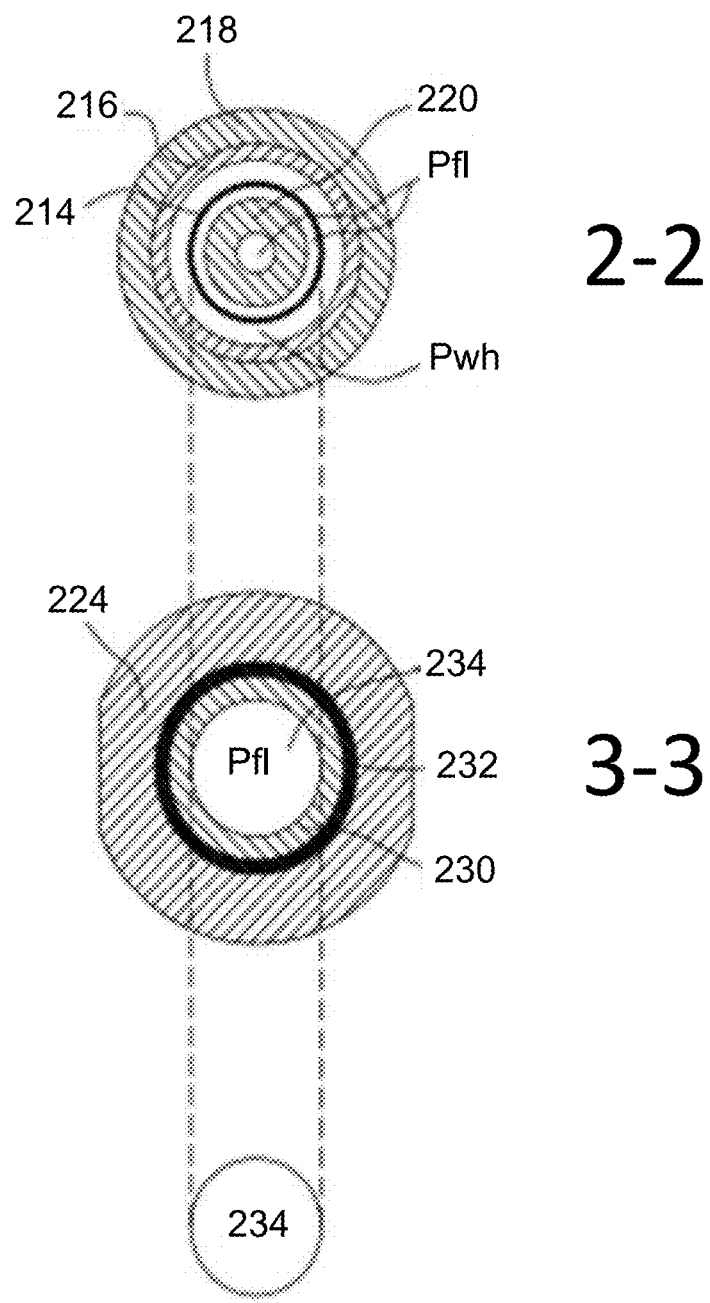
FIG. 2D shows cross-sections 2-2 and 3-3 of the pressure-sensitive oil and gas device from FIG. 2B, according to an embodiment of the present invention.

FIG. 2D shows the 2-2 cross section (top), the 3-3 cross-section (middle), and the projection of seat area 234 from FIG. 2B. In the 2-2 cross section (top), when pressure-sensitive oil and gas device 200 is in the closed configuration, the two interior spaces have the flow line pressure, Pfl, and the exterior space has the high wellhead pressure, Pwh. Stem bellows 214 facilitates a dynamic and frictionless seal during the cyclic operation of pressure-sensitive oil and gas device 200.

In the 3-3 cross-section (middle), valve head 224 surrounds seat ring 232, which surrounds removable seat 230. Seat area 234 has the flow line pressure, Pfl. The 3-3 cross-section illustrates seat area 234 separately. As can be seen, seat area 234 and stem bellows 214 have the same cross-sectional area. This allows the lower flow line pressure, Pfl, of stem bellows 214 not to be affected by the higher wellhead pressure, Pwh, when pressure-sensitive oil and gas device 200 is in the closed position. In other words, the flow line pressure, Pfl, is only actuated on the valve.

FIG. 3 is a graph 300 illustrating operation of a pressure-sensitive oil and gas device from a Barton gauge (e.g., pressure recorder 170 of FIG. 1A), according to an embodiment of the present invention. The bottom line represents the behavior of the flow line pressure, Pfl, where value 310 indicates the arrival of the liquid plug at the surface. The upper line represents the variation of the well head pressure, Pwh, that increases up to value "Pressure Nitrogen High" (PNH—i.e., the calibration by nitrogen of the device) 320, which is the moment when the pressure-sensitive oil and gas device opens.

On the partial disc of graph 300, a four-hour cycle is observed—three hours building up pressure and one hour flowing, ending at value "Pressure Nitrogen Low" (PNL) 330. The flow time 340 of the reservoir is controlled by the size of the choke (e.g., choke 126 of FIG. 1B). If the reservoir is a good producer, it will produce continuously through bypass line 150 of FIG. 1A. Once the well is closed, the cycle begins again with the buildup of pressure and the supply of reservoir pressure. When the recorded cumulative wellhead pressure is greater than the high calibration pressure of the bellows, the cycle begins again by repeating the process.

In some embodiments, the pressure-sensitive oil and gas device is a tool that allows restoring commercial production intermittently in marginal wells that build up wellhead pressure by opening and closing autonomously using at least two bellows, such as HPV bellows 242 and LPV bellows 252 of FIGS. 2A and 2B. If the well produces at a high flow rate, in some embodiments, the reservoir can be drained continuously through a bypass line (e.g., bypass line 150 of FIG. 1A). In certain embodiments, the bellows of the pressure-sensitive oil and gas device are pressurized with a gas (e.g., nitrogen) that causes an HPV bellows and an LPV bellows to operate as opening and closing "sensors", and a third bellows (e.g., a stem bellows) to act as a dynamic seal that controls the LPV bellows, making the pressure-sensitive oil and gas device 100% balanced. In this manner, and in some embodiments, the LPV bellows is balanced and operates such that in a closed position, the LPV bellows is 100% sensitive to the flow line pressure and cannot open, only opening when the HPV bellows opens, and when in an open position, the LPV bellows is 100% sensitive to the wellhead reservoir pressure and closes only when this pressure is lower than the LPV bellows pressure.

In some embodiments, when the pressure-sensitive oil and gas device is in a closed position (see FIG. 2B, for example), the HPV bellows operates as a standard pressure-actuated valve via a longitudinal rod (e.g., perforated stem 220 of FIGS. 2A and 2B) provided with an internal conductor (e.g., perforated stem 226 of FIGS. 2A and 2B), while the LPV bellows is sensitive only to the flow line pressure. The LPV bellows will not open because the internal gas pressure is higher than the flow line pressure. In certain embodiments, the valve that operates with the LPV bellows to control the opening or closing of the well is provided with a second bellows (e.g., stem bellows 214) that operates as a dynamic seal and whose cross-sectional area is equal to the area of a seat (e.g., seat area 234—See FIG. 2D, for example), which allows it to be 100% balanced at flow line pressure in the closed configuration, and also 100% balanced at the wellhead pressure in the open configuration (see FIGS. 2A and 2B).

Perforated (LPV) stem 220 is provided with stem bellows 214, which is a secondary bellows that operates as a hydraulic seal and offers little or no friction. Stem bellows 214 has the same area as the LPV bellows and seat 234 in some embodiments. In the closed position, the high pressure of the well is blocked, and only the flow line pressure can act on the LPV bellows. In other words, the LPV bellows is 100% sensitive to the pressure of the flow line.

In some embodiments, the stem has a nose (e.g., stem nose 222) that is provided with connector holes (e.g., conductor pipe 236) to keep the LPV bellows from closing prematurely due to the Bernoulli effect. In certain embodiments, the pressure-sensitive oil and gas device can be readily connected to an extension tube (e.g., extension tube 125 of FIG. 1B) and provided with a choke (e.g., choke 126), which are located inside the wellhead choke box (e.g., choke box 121). A sleeve (e.g., sleeve 123) may isolate the pressure-sensitive oil and gas device from atmospheric pressure. In certain embodiments, the choke is blind (i.e., solid with no holes inside and no communication) to drain the production from the well through a bypass line (e.g., bypass line 150 of FIG. 1A).

Some embodiments may be particularly suitable for wells whose wellhead pressure decreases as they approach gas line pressure due to liquid hanging in order to drain the hanging liquid intermittently for a few hours to a lower pressure line or to a service pit. In certain embodiments, the pressure-sensitive oil and gas device can be installed in the flow line in low production wells with an intermittent gas lift artificial lift system, with or without liquid hanging. The cycling action of the pressure-sensitive oil and gas device may allow an instantaneous high flow of gas that draws bottom liquids to the surface.

Depleted wells in primary production include those marginal wells that produce by natural energy from the reservoir, but due to the operation time, have low pressure in the wellhead. In these cases, the installation of the pressure-sensitive oil and gas device of some embodiments allows these wells to produce intermittently. Oil and gas producing wells that produce by manual action of opening and closing valves operated by technical field personnel who visit the facility on a daily basis could instead use the pressure-sensitive oil and gas device of some embodiments since autonomous operation may be possible.

Oil and gas producing wells that have a partial obstruction in the tubing that restricts the use of another artificial lift system may be successfully operated and production may be accomplished using the pressure-sensitive oil and gas device of some embodiments. Such a device may allow production from these wells without intervening and removing the obstruction at the bottom. Such a case, the fluid moves through the partial obstruction and towards the surface.

Oil and gas producing wells that have low reservoir pressure and are drowned by the accumulation of fluids at the bottom (typically water) may be restored to production the pressure-sensitive oil and gas device of some embodiments to perform the function of swabbing and extracting the accumulated liquid. In certain embodiments, the pressure-sensitive oil and gas device can be installed in the flowline in wells with a lifting system, such as plunger lift type lifting systems, to carry out the process of opening and closing the well. In some embodiments, the pressure-sensitive oil and gas device can be used to carry out a dewatering process, since as each cycle is carried out, necessary production of fluids may be is obtained to reactivate production.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A pressure-sensitive apparatus for controlling production of oil or gas in a well, comprising:
   a high-pressure valve (HPV) configured to receive a pressure of the well, the HPV comprising an HPV bellows pressurized to an HPV opening pressure;
   a low-pressure valve (LPV) comprising an LPV bellows pressurized to a closing pressure;
   a perforated stem; and
   a stem bellows operably connected to the LPV bellows and the perforated stem, wherein
   the stem bellows is configured to prevent well pressure from opening the pressure-sensitive apparatus prematurely when the pressure-sensitive apparatus is in a closed position,
   the HPV is configured to open the apparatus to produce oil or gas when the HPV exceeds the HPV opening pressure, and
   the LPV is configured to close the apparatus when the LPV reaches the closing pressure.

2. The pressure-sensitive apparatus of claim 1, wherein the pressure-sensitive apparatus is configured to automatically control the production of oil or gas without human control.

3. The pressure-sensitive apparatus of claim 1, wherein the HPV bellows and the LPV bellows are biased to be in a closed position.

4. The pressure-sensitive apparatus of claim 1, wherein the pressure-sensitive apparatus is configured to be installed in a choke box of the well.

5. The pressure-sensitive apparatus of claim 1, wherein the HPV comprises:
   a top sleeve that covers an upper portion of the pressure-sensitive apparatus; and
   a standard valve that protects the pressure-sensitive apparatus, wherein
   the HPV bellows is located within the standard valve.

6. The pressure-sensitive apparatus of claim 5, wherein the top sleeve comprises an opening,
   the standard valve comprises an opening and an outlet, and
   the apparatus is configured such that when the HPV exceeds the HPV opening pressure, oil or gas enters the HPV via the openings in the top sleeve and the standard valve due to contraction of the HPV bellows, and oil or gas leaves the HPV and enters the LPV via the outlet in the standard valve.

7. The pressure-sensitive apparatus of claim 1, wherein the LPV comprises:
   a balanced valve; and
   a middle sleeve enclosing the balanced valve, wherein
   the LPV bellows is located within the balanced valve, and when the LPV reaches the closing pressure, the LPV closes via expansion of the LPV bellows.

8. The pressure-sensitive apparatus of claim 1, further comprising:
   a stem nose comprising a conductor pipe, the conductor pipe configured to prevent premature shutdown of the pressure-sensitive apparatus.

9. The pressure-sensitive apparatus of claim 8, further comprising:
a valve head comprising a valve head inlet, the valve head configured to provide an interface to oil or gas at a well pressure.

10. A pressure-sensitive oil and gas device, comprising:
a standard valve comprising a high-pressure valve (HPV) bellows, an inlet, and an outlet;
a balanced valve comprising an inlet and a low-pressure valve (LPV) bellows;
a perforated stem operably connected to the LPV bellows;
a stem nose comprising a conductor pipe, the stem nose operably connected to the LPV bellows via the perforated stem; and
a stem bellows operably connected to the LPV bellows and the perforated stem, wherein
the stem bellows is configured to prevent well pressure from opening the pressure-sensitive oil and gas device prematurely when the pressure-sensitive oil and gas device is in a closed position.

11. The pressure-sensitive oil and gas device of claim 10, wherein
the HPV bellows is pressurized to an HPV opening pressure, and
the LPV bellows is pressurized to a flow line pressure.

12. The pressure-sensitive oil and gas device of claim 10, further comprising:
a valve head comprising a valve head inlet, the valve head configured to provide an interface to oil or gas at a well pressure.

13. The pressure-sensitive oil and gas device of claim 10, wherein the pressure-sensitive oil and gas device is configured to automatically control the production of oil or gas without human control.

14. The pressure-sensitive oil and gas device of claim 10, wherein
the HPV bellows is pressurized to an HPV opening pressure that is greater than a pressure of the LPV bellows and not more than a maximum well pressure,
the LPV bellows pressurized to at least a flow line pressure, and
the HPV bellows and the LPV bellows are biased to be in a closed position.

15. The pressure-sensitive oil and gas device of claim 10, wherein the pressure-sensitive oil and gas device is configured to be installed in a choke box of the well.

16. The pressure-sensitive oil and gas device of claim 10, further comprising:
a top sleeve that covers an upper portion of the pressure-sensitive oil and gas device that comprises the standard valve, wherein
the top sleeve comprises an opening,
the standard valve comprises an opening and an outlet, and
the pressure-sensitive oil and gas device is configured such that when oil or gas surrounding the HPV bellows exceeds a pressure of the HPV bellows, oil or gas enters the openings in the top sleeve and the standard valve due to contraction of the HPV bellows, and oil or gas leaves the standard valve and enters the balanced valve via the outlet in the standard valve.

17. A pressure-sensitive oil and gas device, comprising:
a standard valve comprising a high-pressure valve (HPV) bellows, an inlet, and an outlet;
a balanced valve comprising an inlet and a low-pressure valve (LPV) bellows;
a perforated stem operably connected to the LPV bellows; and
a stem nose comprising a conductor pipe, the stem nose operably connected to the LPV bellows via the perforated stem; and
a valve head comprising a valve head inlet, the valve head configured to provide an interface to oil or gas at a well pressure, wherein
the HPV bellows is pressurized to an HPV opening pressure that is greater than a pressure of the LPV bellows and not more than a maximum well pressure,
the LPV bellows pressurized to at least the flow line pressure,
the HPV bellows and the LPV bellows are biased to be in a closed position, and
the pressure-sensitive oil and gas device is configured to be installed in a choke box of the well.

18. The pressure-sensitive oil and gas device of claim 17, wherein the pressure-sensitive oil and gas device is configured to automatically control the production of oil or gas without human control.

19. The pressure-sensitive oil and gas device of claim 17, further comprising:
a top sleeve that covers an upper portion of the pressure-sensitive oil and gas device that comprises the standard valve, wherein
the top sleeve comprises an opening,
the standard valve comprises an opening and an outlet, and
the pressure-sensitive oil and gas device is configured such that when oil or gas surrounding the HPV bellows exceeds a pressure of the HPV bellows, oil or gas enters the openings in the top sleeve and the standard valve due to contraction of the HPV bellows, and oil or gas leaves the standard valve and enters the balanced valve via the outlet in the standard valve.

\* \* \* \* \*